United States Patent [19]
Melo

[11] Patent Number: 5,255,379
[45] Date of Patent: Oct. 19, 1993

[54] METHOD FOR AUTOMATICALLY TRANSITIONING FROM V86 MODE TO PROTECTED MODE IN A COMPUTER SYSTEM USING AN INTEL 80386 OR 80486 PROCESSOR

[75] Inventor: Michael D. Melo, Billerica, Mass.

[73] Assignee: Sun Microsystems, Inc., Mountain View, Calif.

[21] Appl. No.: 636,075

[22] Filed: Dec. 28, 1990

[51] Int. Cl.⁵ .......................... G06F 12/02; G06F 9/40
[52] U.S. Cl. .................................. 395/400; 395/700;
364/DIG. 2; 364/976; 364/976.1; 364/976.2;
364/976.3; 364/978; 364/978.2
[58] Field of Search ... 364/200 MS File, 900 MS File;
395/400, 425, 700

[56] References Cited

U.S. PATENT DOCUMENTS

| | | | |
|---|---|---|---|
| 4,926,322 | 5/1990 | Stimac et al. | 395/500 |
| 4,928,237 | 5/1990 | Bealkowski et al. | 395/500 |
| 4,974,159 | 11/1990 | Hargrave et al. | 395/650 |
| 5,027,273 | 6/1991 | Letwin | 395/400 |
| 5,144,551 | 9/1992 | Cepulis | 395/650 |

OTHER PUBLICATIONS

Hayes, Frank, "Stretching DOS to the Limit", BYTE IBM Special Edition, vol. 14, No. 11, Fall 1989, pp. 79-84.
Turley, James L., *Advanced 80386 Programming Techniques*, Osborne McGraw-Hill 1988, Chapter 9, pp. 283-315.

*Primary Examiner*—Rebecca L. Rudolph
*Attorney, Agent, or Firm*—Blakely Sokoloff Taylor & Zafman

[57] ABSTRACT

A method for transitioning an Intel processor from virtual 8086 (V86) mode to protected mode operation which detects when a virtual V86 processor attempts to transition to protected mode, stores all of the information concerning the virtual processor at the time of the attempt to transition to protected mode, remaps the memory allotted to the virtual processor to the memory space used in running a process in real mode, sets up a dummy stack to provide for operation during a transition to protected mode, moves a process for transitioning to real memory space, shifts all of the register values to values for real memory space, and finally reactivates the transition to protected mode.

14 Claims, 4 Drawing Sheets

SEGMENT REGISTERS

| SELECTOR | BASE ADDRESS, LIMIT | CS |
|---|---|---|
| SELECTOR | BASE ADDRESS, LIMIT | SS |
| SELECTOR | BASE ADDRESS, LIMIT | DS |
| SELECTOR | BASE ADDRESS, LIMIT | ES |
| SELECTOR | BASE ADDRESS, LIMIT | FS |
| SELECTOR | BASE ADDRESS, LIMIT | GS |

METHOD FOR AUTOMATICALLY TRANSITIONING FROM V86 MODE TO PROTECTED MODE IN A COMPUTER SYSTEM USING AN INTEL 80386 OR 80486 PROCESSOR

BACKGROUND OF THE INVENTION

1. Field Of The Invention

This invention relates to computer systems and, more particularly, to methods and apparatus for automatic transition from V86 mode to protected mode of an Intel 80386 or 80486 microprocessor.

2. History Of The Prior Art

Intel Corporation has produced a number of microprocessors which have been used as the basis of personal computers. The 8088 processor became the basis for the IBM personal computer and an entire industry of similar machines. After the 8088 processor, Intel developed improved processors with additional capabilities. The 80286 processor was the basis for an improved personal computer referred to as the AT. Later processors in the same series are the 80386 and 80486 microprocessors.

The 8088 processor and the very similar 8086 processor have an addressing scheme which allows a single program to be operated in a maximum of one megabyte of random access memory. The 80286 and succeeding microprocessors, on the other hand, provide much larger address spaces through the use of a virtual memory addressing system and, with the later processors, additional processor address lines. The use of virtual addresses allows addressing of memory space in addition to that which may be physically included in random access memory. The virtual addresses are translated through the use of a segmentation unit and page tables to physical addresses, and the information is retrieved from wherever in memory it may be stored. If that is long term memory, then the data is first placed in random access memory for use by the processor.

In order to allow the 80286 microprocessor to operate with the myriad of programs which exist for the earlier processors, Intel provided an addressing scheme called real mode in which virtual memory is not supported and only the original maximum random access memory size of one megabyte can be accessed. In this real mode of operation, the processor operates essentially as a fast 8088 or 8086 microprocessor. In this mode, only a single program may be run safely because the system offers no protection against programs overflowing into memory space that is used by other programs.

For most programs, the real mode of operation is sufficient. However, in order to allow access to a much larger memory space, a virtual memory unit was provided. The virtual memory system includes the paging mechanism and the segmentation unit and offers a protected mode of operation. The protected mode allows individual segments of memory to be set up with protected access so that, among other things, portions of programs cannot overflow into other portions of programs and interrupt their operations. A significant problem with the 80286 processor, however, is its inability to switch from the protected to the real mode of operation without resetting the system. Resetting the system requires that all program operating in protected mode be closed before the system is reset. This is a cumbersome operation. U.S. Pat. Ser. No. 4,779,187, Kirkland, issued Oct. 18, 1988, and assigned to Microsoft Corporation, offers a solution to this important problem.

In order to provide additional memory space to run larger programs and to speed operation over that of the 80286 processor, the 80386 and 80486 processors were devised. These two processors are quite similar to one another except that the 80486 processor has a number of components built into the processor chip which could only be included as system peripherals with the 80386 processor. For example, the 80486 includes a built-in data and instruction cache and a numerical coprocessor which are not a part of the 80386 processor.

The 80386 and 80486 processors are both thirty-two bit processors and are capable of addressing a very large memory space through the use of virtual memory addressing. However, in addition to the real and protected modes of operation which are offered by the 80286 processor, both of these processors offer a third mode of operation called the virtual 8086 (V86) mode. In this third mode of operation, the operating system runs a monitoring program in protected mode. This monitoring program is capable of setting up in memory a number of individual virtual 8086 processors each operating in what is an emulation of the real mode of operation of the 8086 or 8088 microprocessor. In V86 mode, the individual virtual processors are set up to operate within protected segments of memory into which no other program may intrude. This mode of operation assists in accomplishing multitasking. However, these virtual 8086 processors are constrained by the protection afforded by this system to function within the memory limits of the 8086 machines and do not have available to them those functions which are available in protected mode. Often, it would be desirable to switch one of these programs into protected mode so that it could utilize the larger memory space and other facilities of that mode.

Although it might be desirable to switch one of the individual programs running in V86 mode into the protected mode to obtain the functionality of that mode providing for such a switch presents problems. In particular, for the operating system controlling the V86 mode processes must run its monitoring program in the protected mode in order to control the memory space blocked out for the individual application programs running as multiple virtual processors in the V86 mode of operation, to provide instruction emulation, port I/O emulation, and certain other functions for the virtual processors. Were an individual application program to be able to switch to the protected mode of operation from the V86 mode, that program would control the operation of the system; and the operating system would be forced to close the monitoring program maintaining the V86 processors in operation and the other application programs operating on V86 virtual processors. As the processors are constructed, this would cause a system crash.

SUMMARY OF THE INVENTION

It, is therefore, an object of the present invention to provide a method for allowing a program operating in V86 mode on an Intel 80386 or 80486 microprocessor based computer system to switch to the protected mode of operation.

It is another object of the present invention to provide a method for allowing a program operating in V86 mode on an Intel 80386 or 80486 microprocessor based computer system to switch transparently to the protected mode of operation.

It is another more specific object of the present invention to provide a method for allowing a program operating in V86 mode on an Intel 80386 or 80486 microprocessor in a computer system running a plurality of processors to switch transparently to the protected mode of operation.

These and other objects of the present invention are realized in a method which detects when a virtual V86 processor attempts to transition to protected mode, stores all of the information concerning the virtual processor at the time of the attempted transition to protected mode, remaps the memory allotted to the virtual processor to the memory space used in running a process in real mode, sets up a dummy stack to provide for operation during a transition to protected mode, moves a process for transitioning to real memory space, shifts all of the register values to values for real memory space, and finally reactivates the transition to protected mode.

These and other objects and features of the invention will be better understood by reference to the detailed description which follows taken together with the drawings in which like elements are referred to by like designations throughout the several views.

BRIEF DESCRIPTION OF THE DRAWINGS

Figures 1A, 1B:
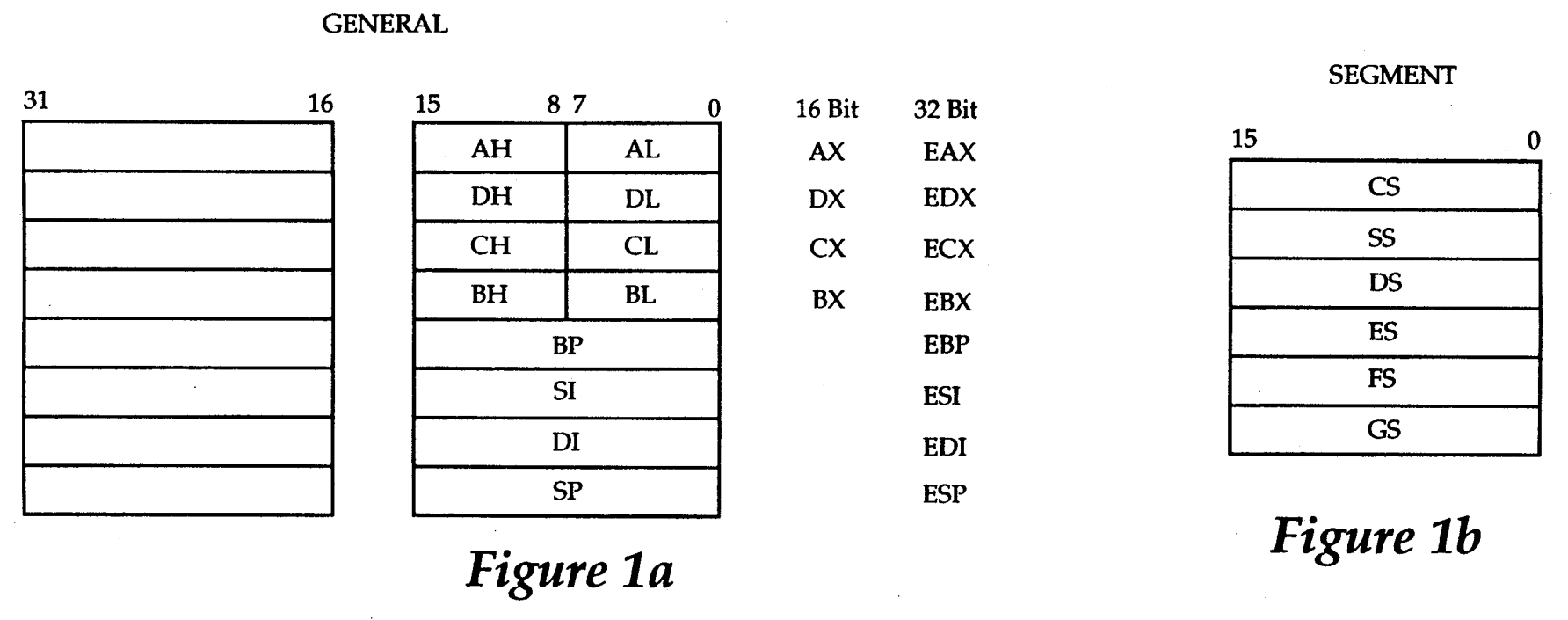
Figures 1C, 1D, 1E, 1F:
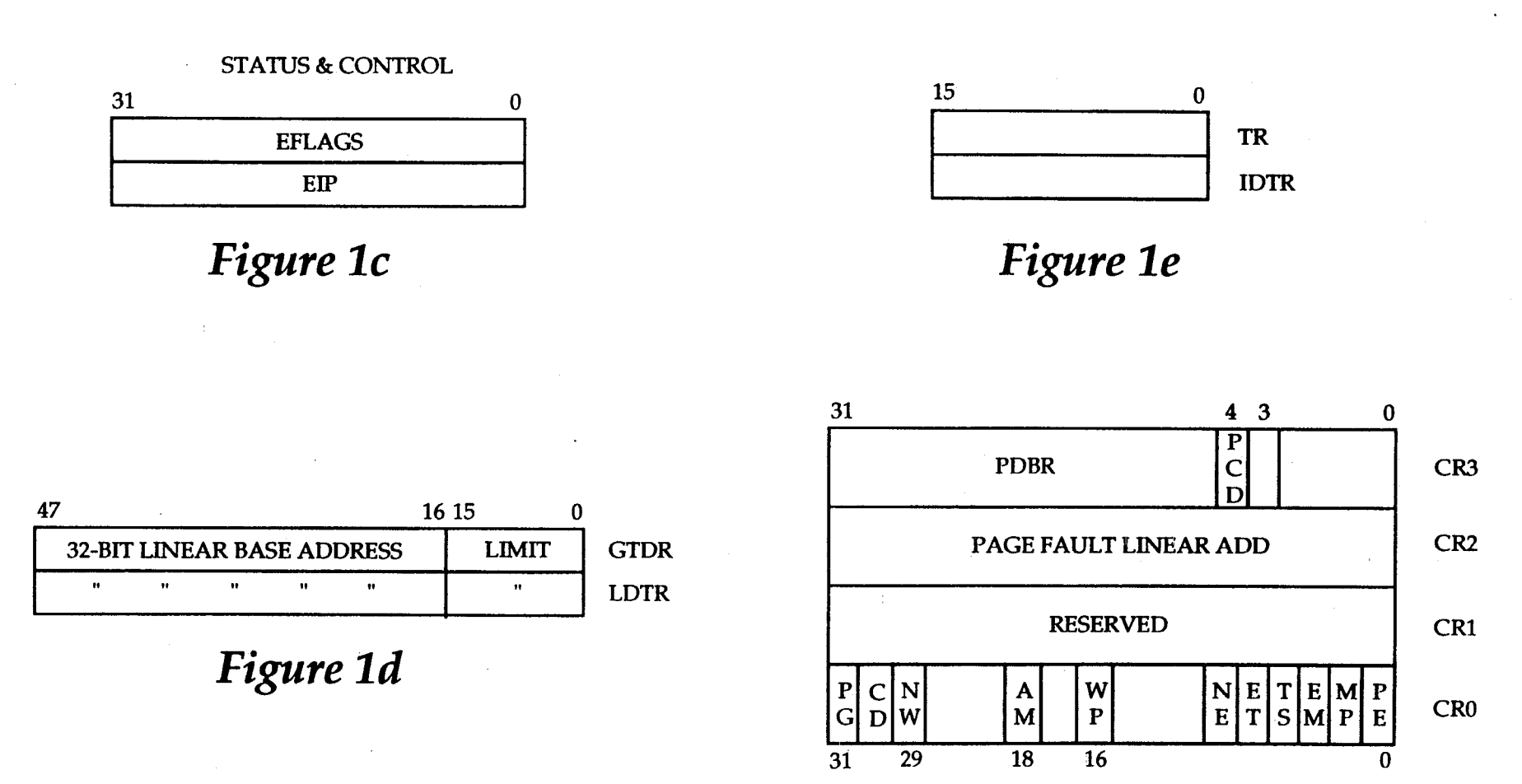

FIGS. 1a-1f illustrate the registers of the Intel processors important to the present invention.

NOTATION AND NOMENCLATURE

Figures 2, 3:
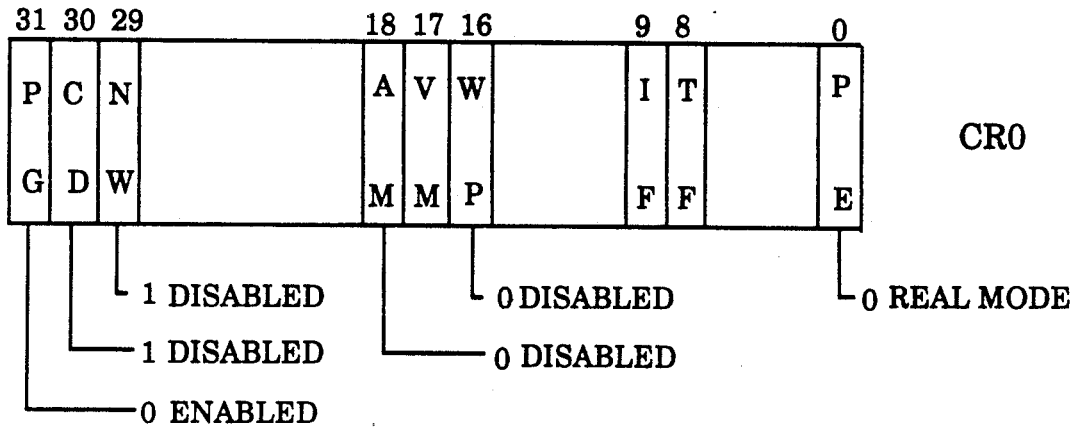
FIG. 2 is a diagram illustrating the EFLAGS register of the Intel processors upon a transition to protected mode.
FIG. 3 is a diagram illustrating the segment registers of Intel processors in more detail.

Some portions of the detailed descriptions which follow are presented in terms of symbolic representations of operations on data bits within a computer memory. These descriptions and representations are the means used by those skilled in the data processing arts to most effectively convey the substance of their work to others skilled in the art. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary or desirable in most cases in any of the operations described herein which form part of the present invention; the operations are machine operations. The operations of the present invention are usually performed by general purpose digital computers or other similar devices. In all cases the distinction between the method operations in operating a computer and the method of computation itself should be borne in mind. The present invention relates to method steps for operating a computer in processing electrical or other (e.g. mechanical, chemical) physical signals to generate other desired physical signals.

DETAILED DESCRIPTION OF THE INVENTION

The Intel 80386 and 80486 microprocessors each have three modes of operation: real, protected, and V86 modes. When a computer using one of these processors is first turned on, it begins operation in the real mode. In this mode, sixteen bit addresses (extended to twenty bits in a manner to be explained below) are used, and the addresses refer to physical positions in random access memory. Virtual memory is not enabled and only one megabyte of memory is addressable. This mode offers no protection to the various elements of the program; and it is possible, for example, for parts of a program to overflow into other parts. This mode is, however, perfectly adapted to run single application programs designed to run on the earlier 8088 and 8086 microprocessors.

Because of the limited memory space available to programs and because no protection is available in real mode, many more advanced software programs may function better using the protected mode of operation. In the protected mode of operation, protection is offered, among other things, for the type of information involved such as stack, data, or instructions; for the type of operations which may be accomplished with the information such as writing or reading; for the size of a protected area of memory; and for type of program allowed to access a protected area of memory. This is accomplished through the use of designated segments which may occupy an amount of memory chosen by the programmer and offer for the information stored in the segment the above-listed protections.

In order to understand the modes of operation of the Intel processors, it is necessary to understand the structure of these processors and the addressing scheme utilized. FIGS. 1a-1f illustrate the registers of the 80386 and 80486 processors which are important to understanding this invention and are referred to hereinafter. The 80386 and 80486 processors each include eight thirty-two bit general registers EAX, EBX, ECX, EDX, ESI, EDI, EBP, and ESP. The sixteen lower order bits of these registers are independently addressable as the AX, BX, CX, DX, SI, DI, BP, and SP registers for use with half words and the sixteen bit addresses of the real mode. The sixteen lower order bits of the AX, BX, CX, DX registers are independently addressable in eight bit increments as the AH (high), AL (low), BH, BL, CH, CL, DH, and DL registers for byte addressing. In addition, the processors contain six sixteen-bit segment registers which hold segment selectors that index into tables of segment descriptors in memory for determining the addresses of the segments. Two thirty-two bit registers, EFLAGS and EIP (instruction pointer), are used for status and control purposes.

The processors also include four registers used for memory management. A global descriptor table register (GDTR) stores the base address at which a global descriptor table may be found in memory; the global descriptor table holds the segment descriptors which provide a base address, a size, and protections by which segment addressing is accomplished. A local descriptor table register (LDTR) also stores base addresses at which local descriptor tables may be found in memory; a local descriptor table holds the segment descriptors by which segment addressing for individual programs is accomplished. A task register (TR) holds information including the address of a task state descriptor (TSS) in the global descriptor table which is used to switch between programs. An interrupt descriptor table register (IDTR) holds address and other information pointing to a table from which the addresses for interrupt operations may be determined.

Three registers (not shown in FIG. 1) support stack operations. A stack segment register holds a stack segment selector, a stack pointer register holds an offset from the top of the stack, and a stack frame pointer register provides temporary storage for stack operations. In addition to these, the processors include four control registers CR0, CR1, CR2, ands CR3. The CR0 register holds system control flags which control the modes of operation or indicate states which apply to the processor. The CR0 register holds various control bits including a paging bit (31) which must be set for paging to occur and disables paging when cleared.

Memory management in the 80386 and 80486 processors consists of hardware and software for accomplishing segmentation and paging. Segments are independent addresses spaces to which protections may be applied. In order to access memory in the 80386 and 80486 processors, a program issues a logical address. The logical address is translated by the segmentation hardware into a linear address which refers to a particular undivided segment having a size equal to the segment limit. The logical address is associated with a sixteen bit segment selector held in one of the segment registers. Each segment selector points to a descriptor table (global or local) holding a segment descriptor which includes the base address for the segment, its protections, and its size limit. The logical address presented by the program is added to the base address provided by the segment descriptor to produce the linear address. Thus, the logical address is used as an offset into the segment. If paging is not enabled, the linear address is the physical address to be accessed. If paging is enabled, then the linear address is passed to the paging mechanism where a page lookup table is consulted to obtain the physical address.

As explained above, when the processor is first turned on (or reset), it is placed in the real mode of operation. In this mode, the CR0 register is placed by hardware power up into the state shown in FIG. 2. In this condition, although the paging bit (bit 31) is enabled, the paging function is disabled because the processor has the paging enabled bit (bit 0) cleared to indicate real mode. Caching (bit 30) and write through (bit 29) are also disabled. In addition, alignment check (bit 18), write-protect (bit 16), and other protections are all disabled.

After hardware initialization, system software sets up the various data structures needed to run in a particular mode. If the processor is to operate in real mode, then the software sets up the structures necessary to allow the processor to emulate the 8088 or 8086 processor. In this mode, the logical addresses are translated to linear addresses which are, in fact, the physical addresses of the one megabyte of memory available in random access memory. In this mode, address translation from a logical address to a linear address is somewhat different than in other modes. The segment selector value held in a segment register does not point to a segment descriptor but is itself shifted left by four bits to provide a base address. The logical address is extended with four bits in the upper bit positions and added to this base address to provide the linear (and physical) address of twenty bits.

If the system is to operate in protected mode, the system software sets up the data structures necessary to that mode and then switches from real mode to protected mode. In order to run in protected mode, a number of system data structures must be created and a number of registers must be initialized. More particularly, at least the global descriptor table must be set up so that the segment descriptors used in protected mode may be accessed. The global descriptor table must include at least a descriptor for a code segment and a descriptor for a data segment so that the base addresses of those segments, their limits, and their protections may be determined. This requires the execution of a load global descriptor table (LGDT) instruction. In order to access the global descriptor table, the GDTR register must be initialized with the base address and the size limit for the global descriptor table. Any interrupt without a valid descriptor in the interrupt descriptor table will generate a fault. Consequently, an interrupt descriptor table must be created; and the base address for the table and its size limit loaded into the IDTR register. This requires the execution of a load interrupt descriptor table (LIDT) instruction.

Once these initialization steps have been taken, the page enable bit (bit 0) in the CR0 register is set by software in order to switch from real mode to protected mode. This requires the execution of a move (MOV) or a load machine status word (LMSW) instruction. The bit (3) indicating a task switch in the CR0 register must also be cleared by a clear task switch flag (CLTS) instruction to initialize the CR0 register for protected mode. Once in protected mode, the data structures and register initializations which are necessary are determined by the memory management features which are used. The protected mode supports both segmentation and paging, and each of these memory features requires data structures for accomplishing the necessary address translations.

The simplest arrangement for running a single application program using segmentation without paging requires at least a global descriptor table and descriptors for data and code for that application program, as discussed above. If paging is to be added, then the paging bit (31) of the CR0 register must be clear, and a supervisor mode must be added. This supervisor mode requires segment descriptors for its data and code segments as well as those used for whatever application program is run by the user. Paging also requires that a page directory and page tables be set up as data structures to accomplish the address translations necessary for paging. In addition, the control register CR3 which is used as a page descriptor base register must be loaded with the base address of the page tables.

When a number of different application programs are to be run in protected mode, this may require that additional segments be allotted to the operating system and that local descriptor tables be set up for each application program. These local descriptor tables are used (as is the global descriptor table) for providing addresses for segments, in this case the segments used with the particular application program. In order to provide access to the local descriptor tables, segment descriptors for those tables must be provided in the global descriptor table.

In the 80386 and 80486 microprocessors, a program is referred to as a task. A task is started by an exception, jump, interrupt, or call. When one of these instructions for transferring operation is used with a destination calling for a task switch, then switching between programs may take place. A task switch transfers execution from one program to another. When this transfer occurs, the contents of nearly all of the registers used with the old process must be saved, especially the contents of the EFLAGs register which contains the results of the conditional operations already underway The state of the various tasks is saved to the task state segment (TSS) which is a data structure defined by a task state segment descriptor. A task state segment descriptor includes the base address of the task state segment and a busy bit which indicates that the task is presently running or waiting to run. In addition to a task state segment descriptor, a task gate descriptor which provides an indirect index to a task state segment descriptor may be used for transfer of control between tasks.

If multitasking is to take place, then a task state segment must be constructed and a TSS descriptor (and possibly a task gate descriptor) must be created and placed in the global descriptor table so that the task state segment may be accessed and the saved state recovered. In addition, a task register TR must be loaded with an index to the TSS descriptor in the global register so that the task state segment may be accessed. It is this structure which is used for switching between the V86 mode tasks. In fact, V86 mode is an extension of the protected mode.

The 80386 and 80486 processors support the V86 mode of operation by the hardware setup provided in the protected mode of operation. The processors are able to execute a number of 8086 programs as virtual 8086 tasks. A virtual task is set up to provide in software what appears to be a 8086 machine. A virtual 8086 task uses the 80386 or 80486 processor hardware and system software to execute a real mode program. The processor hardware uses the task state segment (TSS) data structure to provide a virtual memory space (which is the first megabyte of the linear address space of the task) and executes the instructions for that task using the processor hardware registers and the virtual memory. The system software controls the interface of any virtual task (V86 processor) with other tasks being executed. This system software is referred to as the virtual 8086 monitor.

In order to switch to the virtual 8086 mode, the VM bit (17) of the CR0 register must be set. The register set of any V86 task includes all of the registers used by the 8086 plus certain of the new registers (including the segment registers FS, GS) of the 80386 and 80486 processors. When operating in the virtual 8086 mode, the processor does not use the selectors for the virtual processors to point to segment descriptors as it does in other tasks of protected mode. Instead the virtual processor combines the selectors with the logical addresses to form linear addresses in the same manner as an 8086 processor would. However, these linear addresses go through the paging unit in order to map to sixty-four kbytes of physical memory.

When running a virtual 8086 task, the processor forms the V86 mode addresses as in real mode and runs the application program which is the virtual task. The processor returns to protected mode in order to run the system virtual machine monitor software. The virtual machine monitor software program runs at the most privileged level of the 80386 or 80486 processor. As with other 80386 or 80486 programs, this program requires all of the descriptor tables and descriptors of any other protected mode program. Consequently, when a V86 processor is running on a 80386 or 80486 processor in a standard computer system, the virtual machine monitor cannot be displaced from control of the operation without causing the system and any other V86 mode processes to crash. Thus, although Intel describes a process for switching from protected mode to real mode in a 80486 process in "i486 Microprocessor Programmer's Reference Manual" at Section 22.5, pp. 22-4, 22-5, no method for switching an application running in V86 mode into protected mode has been provided. To allow such switching would automatically require the displacement of the virtual machine monitor and cause the entire system operation to crash.

There are situations in which it would be very useful to allow an application program running in V86 mode to switch to run in protected mode so that it could make use of the greater memory space as well as the various protections and hardware assists available in protected mode. In a computer running a single 80386 or 80486 processor, it is necessary before this can occur that the system software and any other application programs running in V86 modes be appropriately closed. There are also a number of systems using multiple processors in which the operations of the virtual machine monitor and its associated V86 programs could be switched to operate on another processor so that the transition from V86 to protected mode would be feasible. Various computers include, in addition to a main processor, facilities for including a 80386 or 80486 processor as a secondary processor in order to execute programs designed for IBM personal computers. Such a system might include software which would allow the virtual machine monitor and its associated V86 programs to be run on the basic processor while the single V86 program switched to protected mode on the Intel processor.

Figure 4:
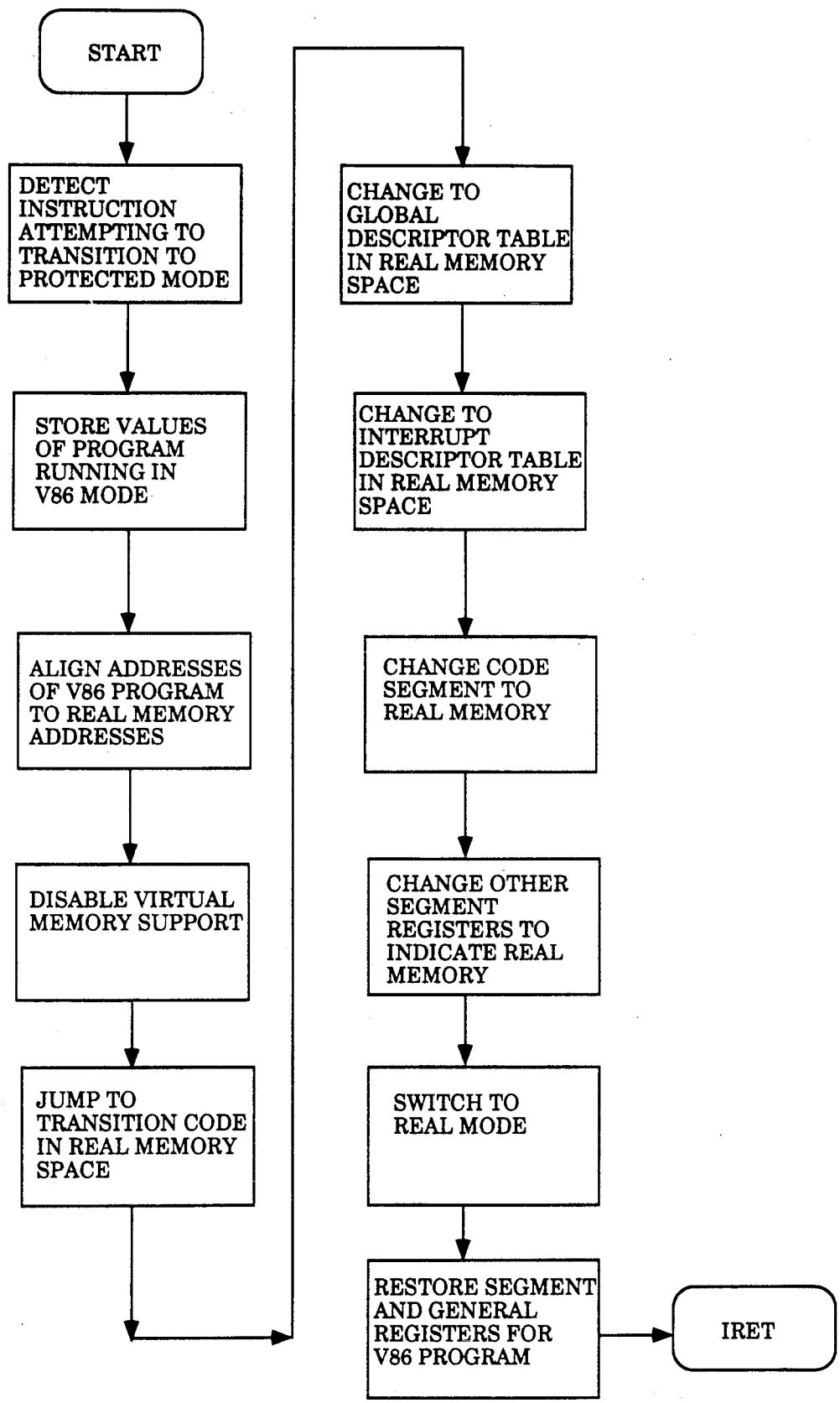
FIG. 4 is a block diagram illustrating a flow chart describing the method of the present invention.

This method of the invention provides a process for allowing the transparent transition of an application program running on a 80386 or 80486 processor in V86 mode into real mode and then immediately into protected mode in order to allow the application program to utilize the facilities of that mode. This process is outlined in FIG. 4. Essentially, the method of the invention detects an attempt by a program running in V86 mode to move from what appears to the program to be real mode operation into protected mode. Such a transition is indicated when a processor in V86 mode attempts to execute certain instructions which are used in real mode for the transition to protected mode. These are the instructions CLTS, LGDT, LIDT, LMSW, and MOV (to special registers) used to set up the transition from real mode to the protected mode referred to above. The 80386 and 80486 processors include hardware for detecting exceptions so that in V86 mode the individual V86 processors cannot affect the operation of other programs running on the processor. When these instructions occur in V86 mode, they generate interrupts which are trapped and used to make sure the V86 programs do not affect other programs. The method of the invention uses these traps to determine when a transition to real mode is to take place. It responds to the detection of one of the instructions by, essentially, taking a picture of the details of the virtual processor running in V86 mode attempting to make the transition to protected mode and transferring the picture of that processor to the physical space in which a program operates in real mode. It then arranges for the various registers and data structures of V86 mode to be changed to those of real mode so that the program can run in real mode. It then switches to real mode and restarts the interrupt-causing instruction so that the transition to protected mode automatically occurs. In this manner, a transition from V86 through real mode to protected mode takes place which is transparent to the user.

The steps of the preferred embodiment for accomplishing the transition are as follows. The first thing that happens is that a small process which is part of the system monitor program and controls the switch to real memory is accessed in response to the trapped instruction via the instruction emulation portion of the virtual memory monitor. This program shuts off the PC hardware peripheral interrupt controllers so that interrupts occurring during this transition will not disturb the transition. It also stores the values of the interrupt controller masks (PICs) in the V86 registers stack image used by the monitor program so that they may be recovered when it is desired to return to the operation of the application.

It will be recognized that in real mode, memory management is not activated for addressing. Consequently, in real mode the beginning memory address used by the operating system and the application program is physical address zero. On the other hand, in V86 mode there may be a number of application programs each running on its own virtual processor each of which appears to have access to a range of addresses from zero to one megabyte. These addresses, however, are virtual addresses which appear to be identical to the physical addresses but do not in most cases map to the same physical addresses. Thus, the virtual address space (virtual addresses from zero to one megabyte) used by the V86 processor attempting the transition is aligned with the physical address space of zero to one megabyte available to a real mode program.

In a system using a master processor and an Intel processor, this operation of aligning requires that the addresses for memory allocated by the master processor for Intel real memory be determined. If these addresses are stored in registers, then a register address may simply be changed in order to remap virtual to real memory.

In a system using only an Intel processor, the operation of aligning requires first copying information from the physical address space from zero to one megabyte to high memory beyond the real address range. Then the information at the virtual memory addresses used for the V86 processor are block copied to the real address space. In this manner, the information used by the V86 processor becomes available at the addresses used in real mode.

In a system using a master processor and an Intel processor and in a system using only an Intel processor, the operation of aligning continues by transferring a short bit of code which is part of the virtual machine monitor to a safe part of the real mode address space. This code (called "wakeup" code) is used after the switch to real mode has occurred to cause the transition to protected mode to start. The address spaces have been aligned to conduct the transition operation in the manner described hereafter. Then the values in the registers of the transitioning program in V86 mode are copied to the real mode address space. This includes the value of the interrupt enable flag held in the EFLAG register for the particular V86 program to enable it to know whether the particular program is accepting interrupts or not. It should be noted that in V86 mode, the EFLAGs register is emulated for each V86 processor so that the monitor program can receive interrupts even when V86 mode tasks have cleared their own interrupt flags.

After these steps, another piece of code (called "shutdown" code) for halting the Intel processor during a short portion of the transition is copied from the monitor program to real mode memory; this code is only necessary in a two processor machine and is used to shut down the Intel processor during a period in which values (e.g., the address of the beginning of real memory space) controlled by the primary processor are adjusted. Then the global descriptor table from the V86 process is copied to the real mode memory space with addresses which are valid in that space. In this manner addressing may be transferred to a real mode global descriptor table which includes addresses in the correct range and with the correct limits for real mode instead of the range used in the V86 mode. An interrupt descriptor table with a single entry which allows the wakeup of the Intel processor from the halted state is then transferred to the real mode memory space.

Next all of the entries in the page table for the lower part of memory (0 to 4 megabytes, for example) are changed so that they map to real mode memory instead of virtual memory. This is accomplished by selecting the amount of memory to be used for real mode and changing the page table entries for that amount of the page tables so that each virtual address provides a physical address which is identical to the virtual address.

The interrupt table is next loaded with addresses. If the system uses two processors, then it is necessary to turn off the primary processor interrupts so that the processor no longer sends work interrupts such as those which might be used for timing. If there are any outstanding interrupts at the Intel processor level, these are detected and processed so that they will not be outstanding when the processor is turned back on in the protected mode.

Then the GTDR and IDTR registers are loaded to point to the real mode global descriptor table and the interrupt descriptor table which have just been set up.

If the system uses two processors, at this point the value held by the primary processor which indicates the start of the real address space is changed; and the memory map of the host processor is changed to indicate the amount of memory used by the real mode. In general, this must be a sufficient amount of memory to run the application program which is causing the transition. If the system includes only the Intel processor, then this step is not necessary.

When this has been accomplished, the virtual memory hardware support of the Intel processor is disabled by turning off paging (bit 31 in the CR0 register is switched). Paging must be turned off because virtual memory hardware is not usable in real mode. Caching and write through operations are also disabled (bits 30 and 29 in the CR0 register are switched). The translation lookaside buffer which is used for address translation in virtual memory management is also flushed by placing a zero into bit 4 of the CR3 register. By flushing the cache and the translation lookaside buffer, the system processor cannot select stale addresses and information used for the V86 processors as its switches to real mode.

Later, when the processor transitions from real to protected mode, the virtual memory hardware must be initialized. For these reasons, the transition code of the system monitor program must turn off the virtual memory hardware used in V86 mode without shutting itself down. To keep from shutting down the monitor program, the program must transfer the stack used by the system monitor program which resides in memory above the one megabyte level to a small temporary stack in real memory to deal with the transition code. With the temporary stack, the transition code of the monitor program is able to accept interrupts during the short time it is operating during the transition before it relinquishes control to the application program.

The stack is transferred by setting the value in the SS register to a new descriptor, one with a base equal to physical address zero and having a length of one megabyte. The dummy temporary stack to be used with the transition code during the transition is set up by setting a value within the real memory area in the ESP register. Then when the virtual hardware is disabled, the operating system will continue to function; and code and data will appear at the correct addresses.

The method jumps to the low memory real mode transition code (the shutdown code). If a two processor system is involved this is accomplished by turning on the interrupts of the 80486 processor so that it may intercept an interrupt to cause the jump which begins the operation of the second small piece of shutdown code which executes in real mode. The shutdown code is adapted to set up the dummy stack to allow interrupt and exception processing during the transfer to the real mode operations. These instructions must be located at an address below the physical one megabyte limit since real mode supports only this range of addresses. In the preferred embodiment, these instructions are placed in a free area of the PC ROM BIOS as explained above.

Once the dummy stack has been set up, the system waits for the wakeup code to begin. This is caused by the interrupt pointing to that code if two processors are involved. If only a single Intel processor is in the system, the shutdown code leads directly into the wakeup code. At this point, the program changes to the real mode global descriptor table and loads the IDTR register with the address of the real mode interrupt descriptor table; this is the value of physical address zero where the interrupt table is stored in the typical system. The transition program then uses a jump segment override instruction to load the code segment register CS with a segment limit indicating a sixteen-bit one-megabyte long segment starting at real address zero. The other segment registers are loaded with information for a descriptor having sixteen bit segments which are writable, present, and byte granular. FIG. 3 illustrates the base address and limit portions of these registers which is loaded for this purpose.

The transition program then returns the processor to real mode by clearing the page enable bit (bit 0) in the CR0 register. This is followed by a long jump instruction which flushes the instruction prefetch queue so that new instructions may be processed.

Next, the transition program sets up the application program stack for the receipt of an IRET instruction which will cause the transition to the protected mode from real mode. It switches to the application stack and restores the values of the various registers for the application program from the values held in the V86 monitor stack which is stored in the BIOS area of real memory. The program must be careful during the transition to real mode to load all of the processor registers (the general registers, the stack registers, the instruction pointer and the flags register) with the values which were stored in the virtual registers of the V86 virtual processor emulating the registers of the processor. Since these values are all contained in the stack of the V86 monitor program which has been moved to real memory space, this may be accurately accomplished. Moreover, it is important that the order of the restoration of the registers be such that the values which must be used after the transition are not written over during the transition.

In the preferred embodiment of the invention, the method first places the values in the EFLAGS register of the monitor program stack onto the application stack, then the value of the CS register so that it points to the code segment for the instruction which caused the transition to begin, and then the EIP register which points to the index into the code segment for the instruction which caused the transition to begin. Next the value of the EAX register is placed on the application stack. Next the values of the SS and SP registers from the monitor stack are pushed onto the application stack so that they point to real memory instead of the virtual memory. Then the values for the segment registers ES, DS, FS, and GS are transferred from the monitor stack to the application stack.

Then the DI, SI, CX, AX, ES, DS, FS, and GS registers are restored. At this point the PIC mask values are restored so that the real mode application can receive any device interrupts it has enabled. Finally, the application environment restoration is completed by restoring the BX, DX, AX, BP, SS, and AX registers.

This transition returns the environment to one similar to an initial real mode in an Intel processor. The transition happens transparently to the user with no external signs of the switch from V86 to real mode. Once in real mode, the application program is ready to finish the instruction commenced in V86 mode when an attempt was made to transition to protected mode. The completion of this instruction is initiated by an IRET instruction (return from interrupt) which restores the values of the EFLAGS register from the application stack and recommences the original instruction. Since this instruction began the transition to protected mode which caused the initial interrupt, the instruction now causes the processor to continue the transition to protected mode which it attempted in V86 mode, however, now using the new values for real mode. Thus, when, finally, a IRET instruction appears, the program transitions the processor using proper values to the protected mode.

Although the present invention has been described in terms of a preferred embodiment, it will be appreciated that various modifications and alterations might be made by those skilled in the art without departing from the spirit and scope of the invention. The invention should therefore be measured in terms of the claims which follow.

What is claimed is:

1. In a system comprising a processor, real memory space, and virtual memory space, said processor capable of operating in a real mode of operation, a protected mode of operation, and a virtual 8086 (V86) mode of operation utilizing a stack and a monitor program, a method of transitioning said processor from V86 mode to protected mode operation comprising the steps of:

detecting when a V86 processor attempts to transition to protected mode, preserving predesignated information concerning the V86 processor at the time of the attempt to transition to protected mode, copying data from real memory space used in running a process in real mode to high memory beyond real address range, remapping the virtual memory space allotted to the V86 processor to the real memory space used in running a process in real mode, moving a process for transitioning to said real memory space, switching said V86 processor to said real mode of operation, when in real mode, executing said process for transitioning, said process of transitioning causing a transition to protected mode.

2. In a system comprising a processor, real memory addresses, and virtual memory addresses, and registers associated with said processor, said processor capable of operating in a real mode of operation, a protected mode of operation, and a virtual 8086 (V86) mode of operation including paging, a method for transitioning said processor from V86 mode to protected mode operation comprising the steps of:

detecting when a V86 processor attempts to transition to protected mode;

copying data from real memory space used in running a process in real mode to high memory beyond real address range, mapping virtual memory addresses of the V86 processor attempting to transition to protected mode to real memory addresses used for real mode;

copying to said real memory addresses: a process for transitioning to protected mode, values in said registers associated with the V86 processor attempting to transition to protected mode, an interrupt descriptor table of the V86 processor attempting to transition to protected mode, and a global descriptor table of the V86 processor attempting to transition to protected mode;

setting values in a global descriptor table register and an interrupt descriptor table register to point to the global descriptor table and the interrupt descriptor table stored in real memory space;

turning off said paging by the processor; and switching to the process for transitioning to protected mode.

3. The method for transitioning said processor from V86 mode to protected mode operation as claimed in claim 2, in which the process for transitioning to protected mode comprises the steps of:

utilizing the global descriptor table stored in real memory space, loading the interrupt descriptor table register with a pointer to the interrupt descriptor table stored in real memory space, returning to real mode, clearing a prefetch queue, returning to the program running on the virtual V86 processor attempting to transition to protected mode, and initiating said transition to protected mode.

4. In a system comprising a processor, real memory space, and virtual memory space, said processor capable of operating a real mode of operation, a protected mode of operation, and a virtual 8086 (V86) mode of operation, a method for transitioning said processor from said V86 mode of operation to said protected mode of operation, said method comprising the steps of:

while said processor is operating in said V86 mode of operation, said processor detecting whether an instruction indicates a transition into said protected mode of operation;

in response to an instruction indicating a transition into said protected mode of operation, in accordance with a programmed method of operation:

said processor interrupting the execution of said instruction indicating a transition and transferring predesignated information into said real memory space;

following said transfer of predesignated information into said real memory space, said processor switching to said real mode of operation such that said processor utilizes said predesignated information in said real memory space to run in said real mode of operation;

said processor restarting said instruction indicating a transition into said protected mode of operation and responsively transitioning from said real mode of operation into said protected mode of operation.

5. The method for transitioning said processor from said V86 mode of operation to said protected mode of operation as provided in claim 4, wherein said step of said processor detecting whether an instruction indicates a transition into said protected mode of operation includes detecting whether an interrupt has occurred.

6. The method for transitioning said processor from said V86 mode of operation to said protected mode of operation as provided in claim 4, wherein said step of said processor detecting whether an instruction indicates a transition into said protected mode comprises detecting whether any one of the following instructions is to be executed: CLTS, LGDT, LIDT, LMSW, and MOV.

7. The method for transitioning said processor from said V86 mode of operation to said protected mode of operation as provided in claim 4, further comprising the step of:

aligning any virtual memory space used by the processor when in V86 mode when said real memory space.

8. The method for transitioning said processor from said V86 mode of operation to said protected mode of operation as provided in claim 4, wherein said predesignated information includes a wakeup code and said step of transitioning from said real mode of operation into said protected mode of operation utilizes said wakeup code.

9. The method for transitioning said processor from said V86 mode of operation to said protected mode of operation as provided in claim 4, wherein said predesignated information includes: a global descriptor table and in interrupt descriptor table.

10. The method for transitioning said processor from said V86 mode of operation to said protected mode of operation as provided in claim 9, wherein said system further comprises an interrupt descriptor table register, and said method further comprises the step of: loading said interrupt descriptor table register with a real memory space address associated with said interrupt descriptor table.

11. The method for transitioning said processor from said V86 mode of operation to said protected mode of operation as provided in claim 9, wherein said system further comprises a global descriptor table register and said method further comprises the step of: loading said global descriptor table register with a real memory space address associated with said global descriptor table.

12. The method for transitioning said processor from said V86 mode of operation to said protected mode of operation as provided in claim 4, wherein said system further comprises virtual memory hardware support and said method further comprises the step of: disabling said virtual memory hardware support prior to said processor switching to said real mode of operation.

13. The method of transitioning said processor from said V86 mode of operation to said protected mode of operation as provided in claim 4, wherein said system further comprises a control register, and said step of said processor switching to said real mode of operation includes: changing the status of at least one bit in said control register.

14. The method for transitioning said processor from said V86 mode of operation to said protected mode of operation as provided in claim 4, wherein said system further comprises a segment register, and said step of said processor switching to said real mode of operation includes: changing the status of at least one bit in said segment register.

* * * * *

UNITED STATES PATENT AND TRADEMARK OFFICE
CERTIFICATE OF CORRECTION

PATENT NO. : 5,255,379
DATED : October 19, 1993
INVENTOR(S) : Melo

It is certified that error appears in the above-identified patent and that said Letters Patent is hereby corrected as shown below:

In column 13, claim 1 at line 1, please delete " of " and insert -- for --.

Signed and Sealed this

Twenty-first Day of October 1997

Attest:

BRUCE LEHMAN

Attesting Officer

Commissioner of Patents and Trademarks